(12) United States Patent
Hashimoto

(10) Patent No.: US 7,997,364 B2
(45) Date of Patent: Aug. 16, 2011

(54) HYBRID VEHICLE AND CONTROL METHOD OF HYBRID VEHICLE

(75) Inventor: Toshiya Hashimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 163 days.

(21) Appl. No.: 12/388,999

(22) Filed: Feb. 19, 2009

(65) Prior Publication Data
US 2009/0211826 A1    Aug. 27, 2009

(30) Foreign Application Priority Data
Feb. 26, 2008   (JP) ................................. 2008-044926

(51) Int. Cl.
*B60W 20/00*   (2006.01)
(52) U.S. Cl. ............................... 180/65.265; 180/65.29
(58) Field of Classification Search ............. 180/65.265, 180/65.28, 65.285, 65.29
See application file for complete search history.

(56) References Cited

U.S. PATENT DOCUMENTS

| | | | | |
|---|---|---|---|---|
| 5,898,282 A * | 4/1999 | Drozdz et al. | ................. | 318/139 |
| 6,430,482 B1 * | 8/2002 | Wakashiro et al. | ............. | 701/22 |
| 6,611,115 B2 * | 8/2003 | Wakashiro et al. | ........... | 318/139 |
| 6,757,598 B2 * | 6/2004 | Okoshi | ............................ | 701/22 |
| 6,966,803 B2 * | 11/2005 | Hara et al. | ......................... | 440/6 |
| 7,205,731 B2 * | 4/2007 | Nagayama | ..................... | 318/139 |
| 7,258,183 B2 * | 8/2007 | Leonardi et al. | ............. | 180/65.1 |
| 7,395,888 B2 * | 7/2008 | Yamamoto et al. | ........ | 180/65.29 |
| 7,478,692 B2 * | 1/2009 | Taue et al. | ................... | 180/65.29 |
| 7,584,813 B2 * | 9/2009 | Yoshida | ..................... | 180/65.29 |
| 2005/0093494 A1 * | 5/2005 | Nagayama | .................... | 318/139 |
| 2008/0053721 A1 * | 3/2008 | Hoshiba et al. | .............. | 180/65.2 |
| 2009/0266630 A1 * | 10/2009 | Soma et al. | ............... | 180/65.265 |
| 2010/0001671 A1 * | 1/2010 | Yamada et al. | .......... | 318/400.14 |
| 2010/0051367 A1 * | 3/2010 | Yamada et al. | .......... | 180/65.265 |
| 2010/0116575 A1 * | 5/2010 | Nozawa et al. | .......... | 180/65.285 |
| 2010/0140003 A1 * | 6/2010 | Saha et al. | ............... | 180/65.285 |
| 2010/0292880 A1 * | 11/2010 | McGrogan et al. | ............. | 701/22 |
| 2010/0318249 A1 * | 12/2010 | Jinno et al. | ....................... | 701/22 |

FOREIGN PATENT DOCUMENTS

| | | |
|---|---|---|
| JP | H04-125099 | 4/1992 |
| JP | 2006-194133 A | 7/2006 |
| JP | 2007-261399 A | 10/2007 |
| JP | 2007-282357 A | 10/2007 |
| JP | 2007-325351 A | 12/2007 |
| WO | WO 2007-111286 A1 | 10/2007 |

* cited by examiner

*Primary Examiner* — Jeffrey J Restifo
(74) *Attorney, Agent, or Firm* — Kenyon & Kenyon LLP

(57) ABSTRACT

On condition that a motor temperature is lower than a preset reference temperature and that a vehicle speed is lower than a preset reference speed, a booster circuit is controlled to adjust the voltage level of a high voltage system to be not higher than a certain low voltage. On condition that the motor temperature is lower than the preset reference temperature and that the vehicle speed is not lower than the preset reference speed, the booster circuit is controlled to adjust the voltage level of the high voltage system to be not higher than a maximum input voltage. On condition that the motor temperature is not lower than the preset reference temperature, the booster circuit is controlled to adjust the voltage level of the high voltage system to be not higher than the maximum input voltage, irrespective of the vehicle speed. This arrangement effectively improves the overall energy efficiency in a vehicle where the adjustment of the voltage level of the high voltage system to be not higher than the certain low voltage has the higher energy efficiency than the adjustment of the voltage level of the high voltage system to be not higher than the maximum input voltage.

8 Claims, 7 Drawing Sheets

US 7,997,364 B2

HYBRID VEHICLE AND CONTROL METHOD OF HYBRID VEHICLE

This application claims priority to Japanese Patent Application No. 2008-044926 filed 26 Feb. 2008, the content of which is incorporated herein by reference.

BACKGROUND OF THE INVENTION

1. Field of the Invention

The present invention relates to a hybrid vehicle and a control method of the hybrid vehicle.

2. Description of the Prior Art

One proposed configuration of a motor drive control system mounted on a hybrid vehicle includes a converter designed to step up the voltage of an electric power output from a battery and supply the stepped-up voltage to a motor. A voltage command of the motor is set adequately to reduce an overall loss in the system. The converter is then controlled with the set voltage command (see, for example, Japanese Patent Laid-Open No. 2007-325351). This prior art motor drive control system controls the converter to satisfy the set voltage command, with a view to reducing the overall loss in the system and improving the energy efficiency.

SUMMARY OF THE INVENTION

In a hybrid vehicle driven with output of a power from an engine to an axle after torque conversion by a planetary gear mechanism and two motors, a DC-DC converter used for transmission of electric power between the two motors and a battery adjusts the motor-side voltage to be higher than the battery voltage, in order to improve the fuel consumption. The principle of the prior art motor drive control system discussed above may be applied to such a hybrid vehicle to reduce the overall loss in the system. The battery is discharged in the case of failed output of required power from the engine due to the adjustment of the motor-side voltage. This may lead to an over-discharge of the battery.

In the hybrid vehicle and the control method of the hybrid vehicle, there would thus be a demand for improving the overall energy efficiency of the vehicle and protecting an accumulator, such as a secondary battery, from a potential over-discharge.

The present invention accomplishes at least part of the demand mentioned above and the other relevant demands by the following configurations applied to the hybrid vehicle and the control method of the hybrid vehicle.

According to one aspect, the present invention is directed to a hybrid vehicle including: an internal combustion engine; an electric power-mechanical power input output assembly connected with a driveshaft linked to an axle of the hybrid vehicle and with an output shaft of the internal combustion engine in such a manner as to be rotatable independently of the driveshaft and configured to input and output power to and from the driveshaft and the output shaft through input and output of electric power and mechanical power; a motor constructed to input and output a power for driving the hybrid vehicle; an accumulator designed to be chargeable and dischargeable; and a voltage adjustment-power transmission structure connected with the electric power-mechanical power input output assembly and with the motor, linked with the accumulator, and configured to adjust a voltage on a drive system side toward the electric power-mechanical power input output assembly and the motor and a voltage on an accumulator side toward the accumulator and thereby allow transmission of electric power between the drive system side and the accumulator side. The hybrid vehicle also has: a vehicle speed detector constructed to detect a vehicle speed of the hybrid vehicle; a driving force demand setting module configured to set a driving force demand required for driving the hybrid vehicle; and a controller. On condition that the detected vehicle speed is lower than a preset reference vehicle speed, the controller controls the voltage adjustment-power transmission structure to adjust the voltage on the drive system side to be not higher than a first voltage, which is less than an allowable maximum voltage set based on rated values of the electric power-mechanical power input output assembly and the motor, while controlling the internal combustion engine, the electric power-mechanical power input output assembly, and the motor to drive the hybrid vehicle with a driving force equivalent to the set driving force demand. On condition that the detected vehicle speed is not lower than the preset reference vehicle speed, the controller controls the voltage adjustment-power transmission structure to adjust the voltage on the drive system side to be not higher than the allowable maximum voltage, while controlling the internal combustion engine, the electric power-mechanical power input output assembly, and the motor to drive the hybrid vehicle with a driving force equivalent to the set driving force demand.

When the vehicle speed is lower than the preset reference vehicle speed, the hybrid vehicle according to this aspect of the invention controls the voltage adjustment-power transmission structure to adjust the voltage on the drive system side toward the electric power-mechanical power input output assembly and the motor to be not higher than the first voltage, which is less than the allowable maximum voltage set based on the rated values of the electric power-mechanical power input output assembly and the motor, while controlling the internal combustion engine, the electric power-mechanical power input output assembly, and the motor to drive the hybrid vehicle with the driving force equivalent to the required driving force demand. When the vehicle speed is not lower than the preset reference vehicle speed, on the other hand, the hybrid vehicle of the invention controls the voltage adjustment-power transmission structure to adjust the voltage on the drive system side to be not higher than the allowable maximum voltage, while controlling the internal combustion engine, the electric power-mechanical power input output assembly, and the motor to drive the hybrid vehicle with the driving force equivalent to the required driving force demand. This arrangement effectively improves the overall energy efficiency in the hybrid vehicle where the adjustment of the voltage on the drive system side to be not higher than the first voltage has the higher energy efficiency than the adjustment of the voltage on the drive system side to be not higher than the allowable maximum voltage. This arrangement also protects the accumulator from a potential over-discharge due to failed output of the driving force demand from the internal combustion engine in the state of adjusting the voltage on the drive system side to be not higher than the first voltage.

In the hybrid vehicle of the present invention, the hybrid vehicle further having: a temperature detector constructed to detect a temperature of either the electric power-mechanical power input output assembly or the motor, wherein on condition that the detected temperature is not lower than a preset reference temperature, the controller controls the voltage adjustment-power transmission structure to adjust the voltage on the drive system side to be not higher than the maximum allowable voltage, irrespective of the detected vehicle speed, while controlling the internal combustion engine, the electric power-mechanical power input output assembly, and the motor to drive the hybrid vehicle with the driving force equivalent to the set driving force demand. In general, when a motor and a generator are operated, a current flow through the motor and the generator is decreased with increasing voltage. When a temperature of the electric power-mechanical power input output assembly and the motor is high, the controller controls the voltage adjustment-power transmission structure to adjust the voltage on the drive system side to be not higher than the maximum allowable voltage. This arrangement effectively prevents a further temperature rise of the electric power-mechanical power input output assembly and motors.

In the hybrid vehicle of the present invention, the controller may set a target drive point of the internal combustion engine based on a power demand corresponding to the set driving force demand and a predetermined restriction, and set driving commands of the electric power-mechanical power input output assembly and the motor to drive the hybrid vehicle with operation of the internal combustion engine at the set target drive point and with satisfaction of the set driving force demand, on condition that the detected vehicle speed is lower than the preset reference vehicle speed, the controller sets an object voltage based on the set driving commands within a range of the first voltage and controls the voltage adjustment-power transmission structure to adjust the voltage on the drive system side to the set object voltage, while controlling the internal combustion engine, the electric power-mechanical power input output assembly, and the motor to drive the hybrid vehicle with operation of the internal combustion engine at the set target drive point and with operations of the electric power-mechanical power input output assembly and the motor at the set driving commands, and on condition that the detected vehicle speed is not lower than the preset reference vehicle speed, the controller sets the object voltage based on the set driving commands within a range of the allowable maximum voltage and controls the voltage adjustment-power transmission structure to adjust the voltage on the drive system side to the set object voltage, while controlling the internal combustion engine, the electric power-mechanical power input output assembly, and the motor to drive the hybrid vehicle with operation of the internal combustion engine at the set target drive point and with operations of the electric power-mechanical power input output assembly and the motor at the set driving commands. This arrangement may control the electric power-mechanical power input output assembly and the motor based on the voltage corresponding to the driving command of the electric power-mechanical power input output assembly and the motor.

In the hybrid vehicle of the present invention, on condition that the detected vehicle speed is lower than the preset reference vehicle speed, the controller may control the voltage adjustment-power transmission structure to adjust the voltage on the drive system side to be not higher than the first voltage, which is less than the allowable maximum voltage set based on the rated values of the electric power-mechanical power input output assembly and the motor, while controlling the internal combustion engine, the electric power-mechanical power input output assembly, and the motor to drive the hybrid vehicle with the driving force equivalent to the set driving force demand, on condition that the detected vehicle speed is not lower than the preset reference vehicle speed but is lower than a preset second reference vehicle speed, the controller may control the voltage adjustment-power transmission structure to adjust the voltage on the drive system side to be not higher than a second voltage, which is less than the allowable maximum voltage but is greater than the first voltage, while controlling the internal combustion engine, the electric power-mechanical power input output assembly, and the motor to drive the hybrid vehicle with the driving force equivalent to the set driving force demand, and on condition that the detected vehicle speed is not lower than the preset second reference vehicle speed, the controller may control the voltage adjustment-power transmission structure to adjust the voltage on the drive system side to be not higher than the allowable maximum voltage, while controlling the internal combustion engine, the electric power-mechanical power input output assembly, and the motor to drive the hybrid vehicle with the driving force equivalent to the set driving force demand. This arrangement may effectively improve the overall energy efficiency in the hybrid vehicle in order of, controlling the voltage on the drive system side to be not higher than the first voltage, controlling the voltage on the drive system side to be not higher than the second voltage, controlling the voltage on the drive system side to be not higher than the allowable maximum voltage, while adjusting adequately the electric power-mechanical power input output assembly and the voltage on the motor side. In the hybrid vehicle of the present invention, the controller may set a target drive point of the internal combustion engine based on a power demand corresponding to the set driving force demand and a predetermined restriction, and may set driving commands of the electric power-mechanical power input output assembly and the motor to drive the hybrid vehicle with operation of the internal combustion engine at the set target drive point and with satisfaction of the set driving force demand, on condition that the detected vehicle speed is lower than the preset reference vehicle speed, the controller may set an object voltage based on the set driving commands within a range of the first voltage and controls the voltage adjustment-power transmission structure to adjust the voltage on the drive system side to the set object voltage, while controlling the internal combustion engine, the electric power-mechanical power input output assembly, and the motor to drive the hybrid vehicle with operation of the internal combustion engine at the set target drive point and with operations of the electric power-mechanical power input output assembly and the motor at the set driving commands, on condition that the detected vehicle speed is not lower than the preset reference vehicle speed but is lower than a preset second reference vehicle speed, the controller may set the object voltage based on the set driving commands within a range of the second voltage and controls the voltage adjustment-power transmission structure to adjust the voltage on the drive system side to the set object voltage, while controlling the internal combustion engine, the electric power-mechanical power input output assembly, and the motor to drive the hybrid vehicle with operation of the internal combustion engine at the set target drive point and with operations of the electric power-mechanical power input output assembly and the motor at the set driving commands, and on condition that the detected vehicle speed is not lower than the preset second reference vehicle speed, the controller may set the object voltage based on the set driving commands within a range of the allowable maximum voltage and controls the voltage adjustment-power transmission structure to adjust the voltage on the drive system side to the set object voltage, while controlling the internal combustion engine, the electric power-mechanical power input output assembly, and the motor to drive the hybrid vehicle with operation of the internal combustion engine at the set target drive point and with operations of the electric power-mechanical power input output assembly and the motor at the set driving commands. This arrangement controls the electric power-mechanical power input output assembly and the motor based on the voltage corresponding to the driving command of the electric power-mechanical power input output assembly and the motor.

In the hybrid vehicle of the present invention, the electric power-mechanical power input output assembly may have a generator constructed to input and output power; and a three shaft-type power input output structure connected to three shafts, the driveshaft, the output shaft of the internal combustion engine, and a rotating shaft of the generator, and designed to input and output power to a residual shaft based on powers input from and output to any two shafts among the three shafts.

The present invention directed to a control method of a hybrid vehicle, the hybrid vehicle having: an internal combustion engine; an electric power-mechanical power input output assembly connected with a driveshaft linked to an axle of the hybrid vehicle and with an output shaft of the internal combustion engine in such a manner as to be rotatable independently of the driveshaft and configured to input and output power to and from the driveshaft and the output shaft through input and output of electric power and mechanical power; a motor constructed to input and output a power for driving the hybrid vehicle; an accumulator designed to be chargeable and dischargeable; and a voltage adjustment-power transmission structure connected with the electric power-mechanical power input output assembly and with the motor, linked with the accumulator, and configured to adjust a voltage on a drive system side toward the electric power-mechanical power input output assembly and the motor and a voltage on an accumulator side toward the accumulator and thereby allow transmission of electric power between the drive system side and the accumulator side, on condition that a vehicle speed is lower than a preset reference vehicle speed, the control method controlling the voltage adjustment-power transmission structure to adjust the voltage on the drive system side to be not higher than a first voltage, which is less than an allowable maximum voltage set based on rated values of the electric power-mechanical power input output assembly and the motor, while controlling the internal combustion engine, the electric power-mechanical power input output assembly, and the motor to drive the hybrid vehicle with a driving force equivalent to a required driving force demand, and on condition that the vehicle speed is not lower than the preset reference vehicle speed, the control method controlling the voltage adjustment-power transmission structure to adjust the voltage on the drive system side to be not higher than the allowable maximum voltage, while controlling the internal combustion engine, the electric power-mechanical power input output assembly, and the motor to drive the hybrid vehicle with a driving force equivalent to the required driving force demand.

When the vehicle speed is lower than the preset reference vehicle speed, the control method of the hybrid vehicle according to this aspect of the invention controls the voltage adjustment-power transmission structure to adjust the voltage on the drive system side toward the electric power-mechanical power input output assembly and the motor to be not higher than the first voltage, which is less than the allowable maximum voltage set based on the rated values of the electric power-mechanical power input output assembly and the motor, while controlling the internal combustion engine, the electric power-mechanical power input output assembly, and the motor to drive the hybrid vehicle with the driving force equivalent to the required driving force demand. When the vehicle speed is not lower than the preset reference vehicle speed, on the other hand, the control method of the hybrid vehicle controls the voltage adjustment-power transmission structure to adjust the voltage on the drive system side to be not higher than the allowable maximum voltage, while controlling the internal combustion engine, the electric power-mechanical power input output assembly, and the motor to drive the hybrid vehicle with the driving force equivalent to the required driving force demand. This arrangement effectively improves the overall energy efficiency in the hybrid vehicle where the adjustment of the voltage on the drive system side to be not higher than the first voltage has the higher energy efficiency than the adjustment of the voltage on the drive system side to be not higher than the allowable maximum voltage. This arrangement also protects the accumulator from a potential over-discharge due to failed output of the driving force demand from the internal combustion engine in the state of adjusting the voltage on the drive system side to be not higher than the first voltage.

In the control method of the hybrid vehicle of the present invention, on condition that a temperature of the motor is not lower than a preset reference temperature, the control method may control the voltage adjustment-power transmission structure to adjust the voltage on the drive system side to be not higher than the maximum allowable voltage, irrespective of the vehicle speed, while controlling the internal combustion engine, the electric power-mechanical power input output assembly, and the motor to drive the hybrid vehicle with the driving force equivalent to the required driving force demand. A current flow through the motor is decreased with increasing voltage when outputting the same torque from the motor. When the temperature of the motor is high, the controller controls the voltage adjustment-power transmission structure to adjust the voltage on the drive system side to be not higher than the maximum allowable voltage. This arrangement effectively prevents a further temperature rise of the motor.

In the control method of the hybrid vehicle of the present invention, the control method setting a target drive point of the internal combustion engine based on a power demand corresponding to the required driving force demand and a predetermined restriction, and setting driving commands of the electric power-mechanical power input output assembly and the motor to drive the hybrid vehicle with operation of the internal combustion engine at the set target drive point and with satisfaction of the required driving force demand, on condition that the vehicle speed is lower than the preset reference vehicle speed, the control method setting an object voltage based on the set driving commands within a range of the first voltage and controlling the voltage adjustment-power transmission structure to adjust the voltage on the drive system side to the set object voltage, while controlling the internal combustion engine, the electric power-mechanical power input output assembly, and the motor to drive the hybrid vehicle with operation of the internal combustion engine at the set target drive point and with operations of the electric power-mechanical power input output assembly and the motor at the set driving commands, and on condition that the vehicle speed is not lower than the preset reference vehicle speed, the control method setting the object voltage based on the set driving commands within a range of the allowable maximum voltage and controlling the voltage adjustment-power transmission structure to adjust the voltage on the drive system side to the set object voltage, while controlling the internal combustion engine, the electric power-mechanical power input output assembly, and the motor to drive the hybrid vehicle with operation of the internal combustion engine at the set target drive point and with operations of the electric power-mechanical power input output assembly and the motor at the set driving commands. This arrangement may control the electric power-mechanical power input output assembly and the motor based on the voltage corresponding to the driving command of the electric power-mechanical power input output assembly and the motor.

In the control method of the hybrid vehicle of the present invention, on condition that the vehicle speed is lower than the preset reference vehicle speed, the control method controlling the voltage adjustment-power transmission structure to adjust the voltage on the drive system side to be not higher than the first voltage, which is less than the allowable maximum voltage set based on the rated values of the electric power-mechanical power input output assembly and the motor, while controlling the internal combustion engine, the electric power-mechanical power input output assembly, and the motor to drive the hybrid vehicle with the driving force equivalent to the required driving force demand, on condition that the vehicle speed is not lower than the preset reference vehicle speed but is lower than a preset second reference vehicle speed, the control method controlling the voltage adjustment-power transmission structure to adjust the voltage on the drive system side to be not higher than a second voltage, which is less than the allowable maximum voltage but is greater than the first voltage, while controlling the internal combustion engine, the electric power-mechanical power input output assembly, and the motor to drive the hybrid vehicle with the driving force equivalent to the required driving force demand, and on condition that the vehicle speed is not lower than the preset second reference vehicle speed, the control method controlling the voltage adjustment-power transmission structure to adjust the voltage on the drive system side to be not higher than the allowable maximum voltage, while controlling the internal combustion engine, the electric power-mechanical power input output assembly, and the motor to drive the hybrid vehicle with the driving force equivalent to the required driving force demand. This arrangement may effectively improve the overall energy efficiency in the hybrid vehicle in order of, controlling the voltage on the drive system side to be not higher than the first voltage, controlling the voltage on the drive system side to be not higher than the second voltage, controlling the voltage on the drive system side to be not higher than the allowable maximum voltage, while adjusting adequately the electric power-mechanical power input output assembly and the voltage on the motor side.

DESCRIPTION OF THE PREFERRED EMBODIMENTS

Figure 1:
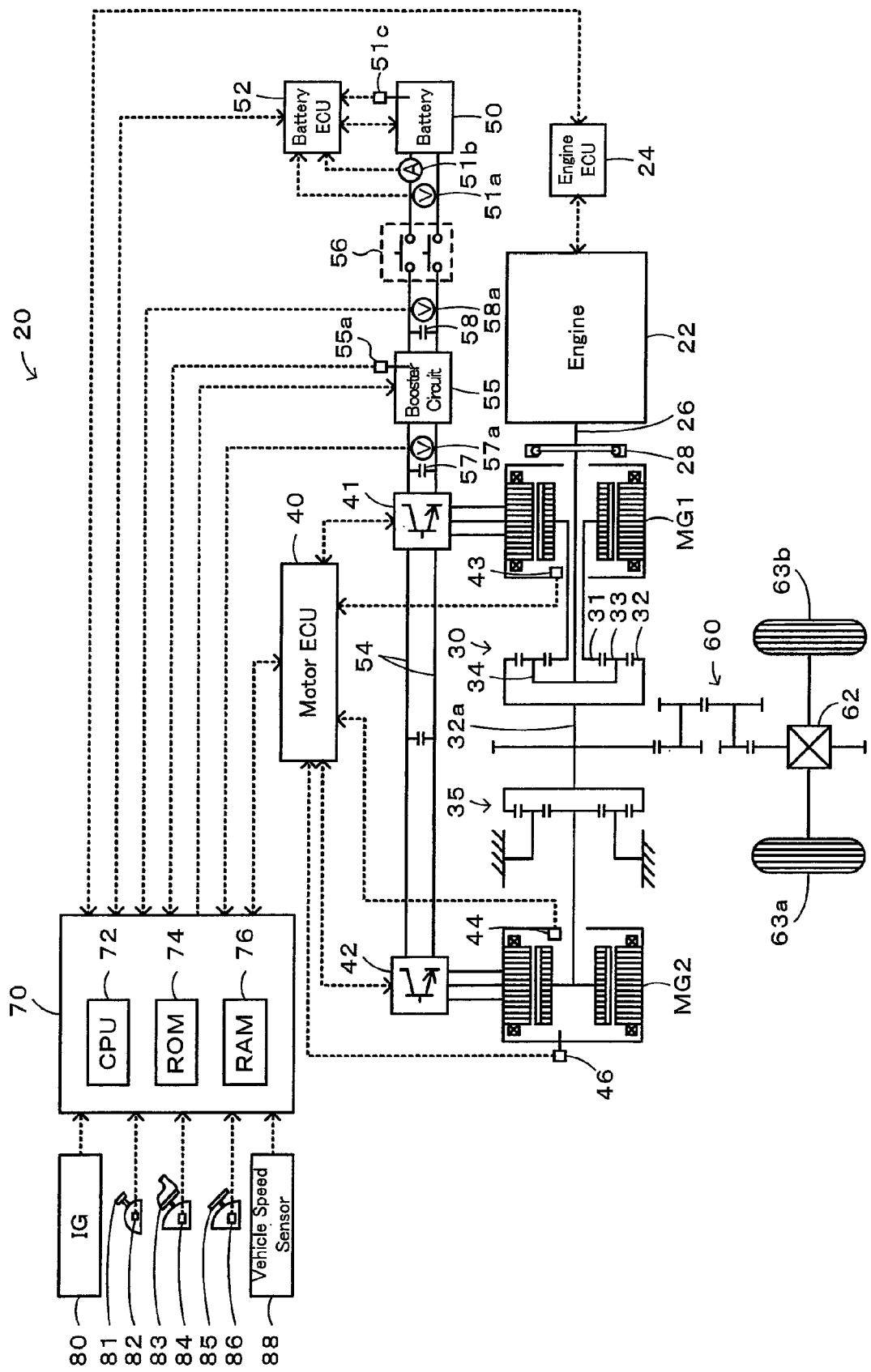
FIG. 1 schematically illustrates the configuration of a hybrid vehicle 20 in one embodiment of the invention.
Figure 2:
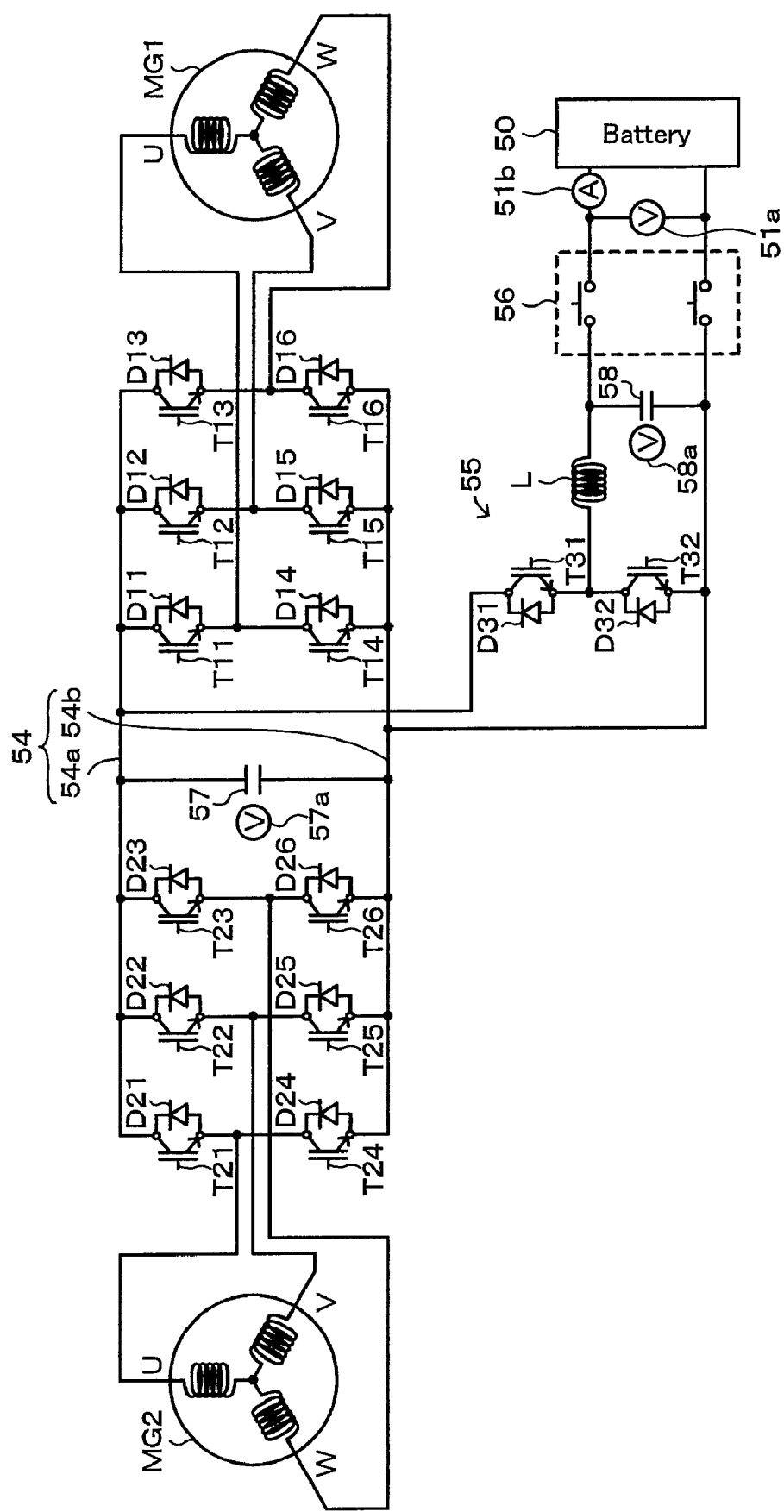
FIG. 2 shows the schematic configuration of an electric driving system including motors MG1 and MG2.

One mode of carrying out the invention is described below as a preferred embodiment with reference to the accompanied drawings. FIG. 1 schematically illustrates the configuration of a hybrid vehicle 20 in one embodiment of the invention. FIG. 2 shows the schematic configuration of an electric driving system including motors MG1 and MG2. As illustrated in FIG. 1, the hybrid vehicle 20 of the embodiment has an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a motor MG2 connected via a reduction gear 35 to a ring gear shaft 32a or a driveshaft linked with the power distribution integration mechanism 30, inverters 41 and 42 arranged to convert dc current into ac current and supply the ac current to the motors MG1 and MG2, a booster circuit 55 configured to convert the voltage of electric power output from a battery 50 and supply the converted voltage to the inverters 41 and 42, a system main relay 56 interposed between the battery 50 and the booster circuit 55, and a hybrid electronic control unit 70 configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition control, and intake air flow control, of an engine electronic control unit (hereafter referred to as engine ECU) 24. The engine ECU 24 inputs diverse signals from various sensors used to measure and detect the operating conditions of the engine 22, for example, a signal representing a crank position from a crank position sensor (not shown) detected as a crank angle of the crankshaft 26 of the engine 22. The engine ECU 24 establishes communication with the hybrid electronic control unit 70 to drive and control the engine 22 in response to control signals from the hybrid electronic control unit 70 and with reference to the diverse signals from the various sensors and to output data regarding the operating conditions of the engine 22 to the hybrid electronic control unit according to the requirements. The engine ECU 24 also computes a rotation speed of the crankshaft 26, which is equivalent to a rotation speed Ne of the engine 22, based on the crank position from the crank positions sensor.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the reduction gear 35 via the ring gear shaft 32a. When the motor MG1 functions as a generator, the power of the engine 22 input via the carrier 34 is distributed to the sun gear 31 and the ring gear 32 corresponding to their gear ratio. When the motor MG1 functions as a motor, on the other hand, the power of the engine 22 input via the carrier 34 is integrated with the power of the motor MG1 input via the sun gear 31 and is output to the ring gear 32. The power output to the ring gear 32 is transmitted from the ring gear shaft 32a through a gear mechanism 60 and a differential gear 62 and is eventually output to drive wheels 63a and 63b of the hybrid vehicle 20.

The motors MG1 and MG2 are constructed as known synchronous motor generators having a rotor with permanent magnets attached to the outer surface thereof and a stator with three-phase coils wounded thereon as shown in FIG. 2. The motors MG1 and MG2 transmit electric power to and from the battery 50 via the inverters 41 and 42 and the booster circuit 55. The motors MG1 and MG2 and the inverters 41 and 42 adopted in the configuration of the embodiment have a maximum input voltage Vset (for example, 650 V) as a rated value. The inverters 41 and 42 respectively consist of six transistors T11 through T16 and T21 through T26 and six diodes D11 through D16 and D21 through D26 arranged in parallel with but in an opposite direction to the corresponding transistors T11 through T16 and T21 through T26. The transistors T11 through T16 and T21 through T26 are arranged in pairs such that two transistors in each pair respectively function as a source and a sink to a common positive bus 54a and a common negative bus 54b shared as power lines 54 by the inverters 41 and 42. The individual phases of the three-phase coils (U phase, V phase, and W phase) are connected to respective connection points of the three paired transistors. Controlling the rate of an on-time of the paired transistors T11 through T16 or T21 through T26 in the state of applying a voltage between the positive bus 54a and the negative bus 54b results in generating a revolving magnetic field on the three-phase coils to drive and rotate the motor MG1 or the motor MG2. The inverters 41 and 42 share the positive bus 54a and the negative bus 54b as mentioned above. Such connection enables electric power generated by one of the motors MG1 and MG2 to be consumed by the other motor MG2 or MG1. A smoothing capacitor 57 is connected with the positive bus 54a and the negative bus 54b. Both the motors MG1 and MG2 are driven and controlled by a motor electronic control unit (hereafter referred to as motor ECU) 40. The motor ECU 40 inputs various signals required for driving and controlling the motors MG1 and MG2, for example, signals representing rotational positions of the rotors in the motors MG1 and MG2 from rotational position detection sensors 43 and 44, a signal representing a motor temperature Tm from a temperature sensor 46 attached to the motor MG2, and signals representing phase currents to be applied to the motors MG1 and MG2 from current sensors (not shown) The motor ECU 40 outputs switching control signals to the transistors T11 through T16 in the inverter 41 and to the transistors T21 through T26 in the inverter 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements. The motor ECU 40 also computes rotation speeds Nm1 and Nm2 of the motors MG1 and MG2 based on the output signals of the rotational position detection sensors 43 and 44.

As shown in FIG. 2, the booster circuit 55 has two transistors T31 and T32, two diodes D31 and D32 arranged in parallel with but in an opposite direction to the transistors T31 and T32, and a reactor L. The two transistors T31 and T32 are respectively connected to the positive bus 54a and to the negative bus 54b of the inverters 41 and 42, and the reactor L is connected at a connection point of the two transistors T31 and T32. A positive terminal and a negative terminal of the battery 50 are respectively connected via the system main relay 56 to the reactor L and to the negative bus 54b. The on-off control of the transistors T31 and T32 results in stepping up the voltage of a dc electric power discharged from the battery 50 and supplying the stepped-up voltage to the inverters 41 and 42, while stepping down a dc voltage applied to the positive bus 54a and the negative bus 54b and charging the battery 50 with the stepped-down voltage. A smoothing capacitor 58 is connected with the reactor L and the negative bus 54b. In the description hereafter, the side of the booster circuit 55 toward the power lines 54 is referred to as the 'high voltage system', whereas the side of the booster circuit 55 toward the battery 50 is referred to as the 'low voltage system'.

The battery 50 is constructed, for example, as a lithium ion secondary battery having a rated voltage of 200V and is under control and management of a battery electronic control unit (hereafter referred to as battery ECU) 52. The battery ECU 52 inputs signals required for management and control of the battery 50, for example, an inter-terminal voltage Vb from a voltage sensor 51a located between terminals of the battery 50, a charge-discharge current Ib from a current sensor 51b located in a power line connecting with the output terminal of the battery 50, and a battery temperature Tb from a temperature sensor 51c attached to the battery 50. The battery ECU 52 outputs data regarding the operating conditions of the battery 50 by communication to the hybrid electronic control unit 70 according to the requirements. The battery ECU 52 also performs various arithmetic operations for management and control of the battery 50, for example, an operation of calculating a remaining charge or state of charge SOC of the battery 50 from an integrated value of the charge-discharge current Ib measured by the current sensor 51b and an operation of setting an input limit Win and an output limit Wout of the battery 50.

The hybrid electronic control unit 70 is constructed as a microcomputer including a CPU 72, a ROM 74 configured to store processing programs, a RAM 76 configured to temporarily store data, input and output ports (not shown), and a communication port (not shown). The hybrid electronic control unit 70 inputs, via its input port, a temperature Tup of the booster circuit 55 (for example, a temperature of the reactor L) from a temperature sensor 55a, a voltage of the capacitor 57 (hereafter referred to as voltage VH in the high voltage system) from a voltage sensor 57a, a voltage of the capacitor 58 from a voltage sensor 58a, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 outputs switching control signals to the transistors T31 and T32 in the booster circuit 55 and driving signals to the system main relay 56 via its output port. The hybrid electronic control unit 70 makes connection with the engine ECU 24, the motor ECU 40, and the battery ECU 52 via its communication port to transmit various control signals and data to and from the engine ECU 24, the motor ECU 40, and the battery ECU 52 as mentioned previously.

The hybrid vehicle 20 of the embodiment constructed as described above sets a torque demand, which is to be output to the ring gear shaft 32a or the driveshaft, based on the vehicle speed V and the accelerator opening Acc corresponding to the driver's depression amount of the accelerator pedal 83, and controls the operations of the engine 22 and the motors MG1 and MG2 to ensure output of a power demand equivalent to the preset torque demand to the ring gear shaft 32a. There are several drive control modes of the engine 22 and the motors MG1 and MG2. In a torque conversion drive mode, while the engine 22 is driven and controlled to ensure output of a power equivalent to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to ensure output of a power corresponding to the sum of the power demand and an electric power required for charging the battery 50 or an electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30 and the motors MG1 and MG2 and to ensure output of a power equivalent to the power demand to the ring gear shaft 32a. In a motor drive mode, the motor MG2 is driven and controlled to ensure output of a power equivalent to the power demand to the ring gear shaft 32a, while the engine 22 stops its operation. In the torque conversion drive mode and in the charge-discharge drive mode, the engine 22 and the motors MG1 and MG2 are controlled to ensure output of the power demand to the ring gear shaft 32a with the operation of the engine 22. There is accordingly no practical difference in control operations. In the description hereafter, the torque conversion drive mode and the charge-discharge drive mode are collectively referred to as the engine drive mode.

Figure 3:
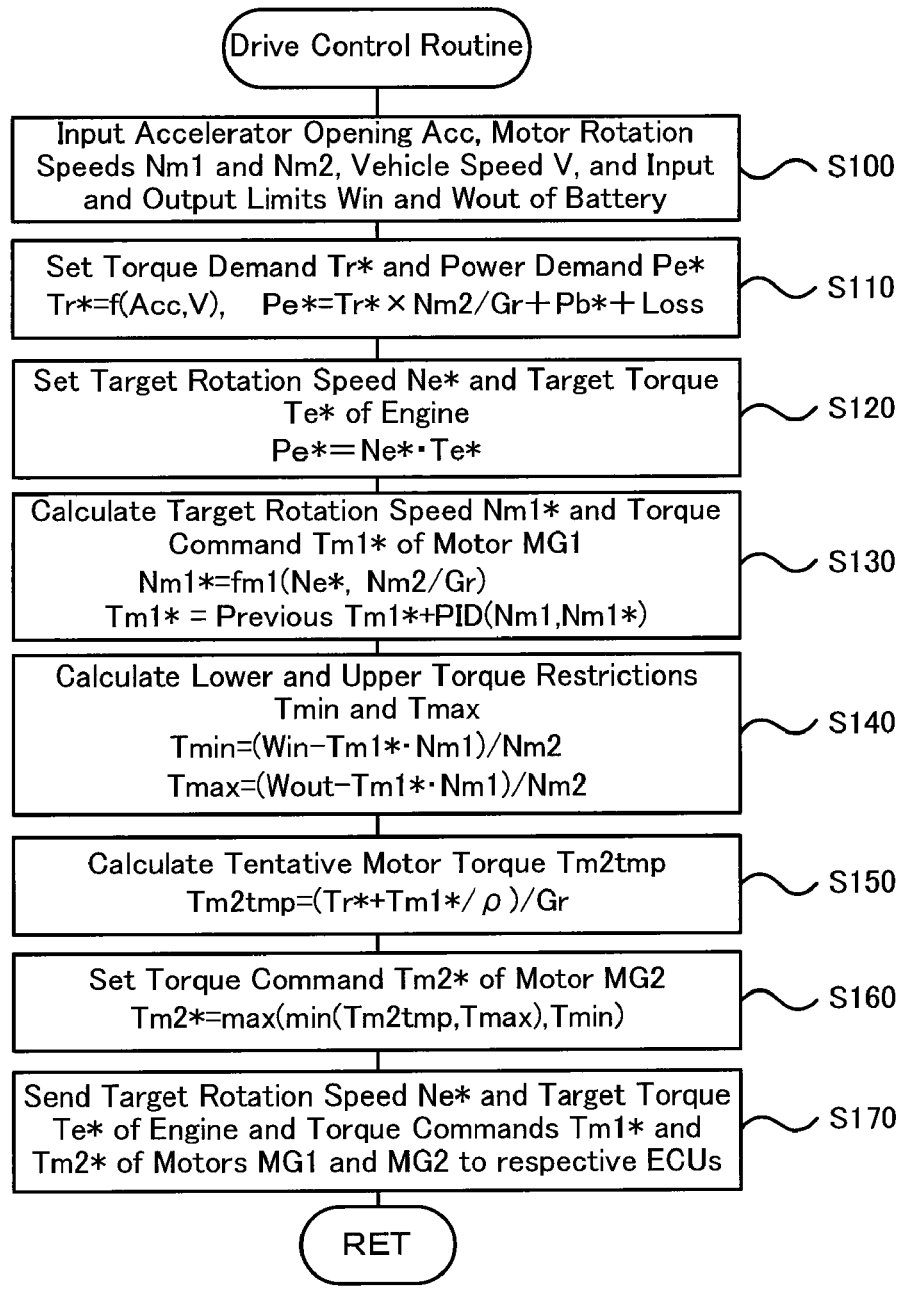
FIG. 3 is a flowchart showing a drive control routine executed by a hybrid electronic control unit 70 incorporated in the hybrid vehicle of the embodiment.
Figure 4:
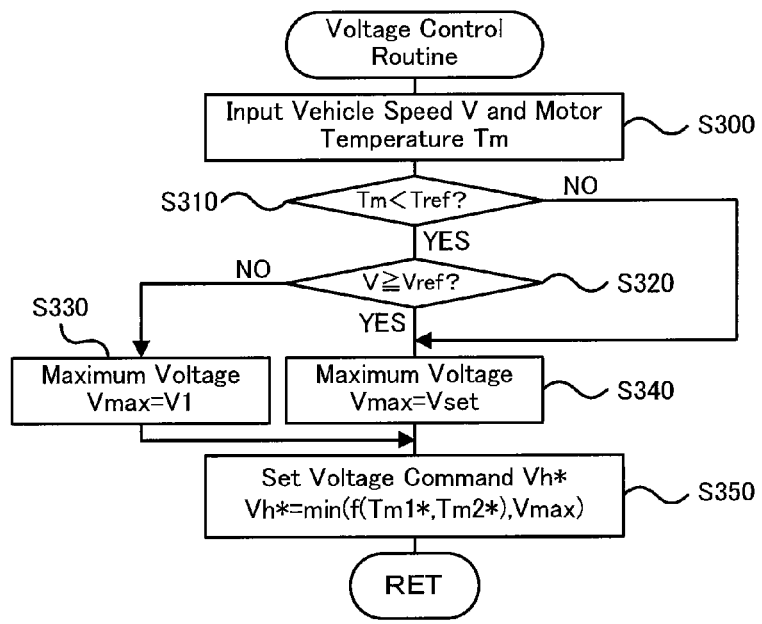
FIG. 4 is a flowchart showing a voltage control routine executed by the hybrid electronic control unit 70.

The description regards the operations of the hybrid vehicle 20 of the embodiment having the configuration described above, especially a series of operations in drive control accompanied with voltage adjustment in the high voltage system. FIG. 3 is a flowchart showing a drive control routine executed by the hybrid electronic control unit 70 in the embodiment. FIG. 4 is a flowchart showing a voltage control routine executed to control the voltage in the high voltage system. These routines are performed repeatedly at preset time intervals (for example, at every several msec). The description regards the drive control and the voltage control in this sequence.

In the drive control routine, the CPU 72 of the hybrid electronic control unit 70 inputs various data required for drive control, for example, the accelerator opening Acc from the accelerator pedal position sensor 84, the vehicle speed V from the vehicle speed sensor 88, rotation speeds Nm1 and Nm2 of the motors MG1 and MG2, and the input limit Win and the output limit Wout of the battery 50 (step S100). The rotation speeds Nm1 and Nm2 of the motors MG1 and MG2 are computed from the rotational positions of the rotors in the motors MG1 and MG2 detected by the rotational position detection sensors 43 and 44 and are input from the motor ECU 40 by communication. The input limit Win and the output limit Wout of the battery 50 are set based on the battery temperature Tb and the state of charge SOC of the battery 50 and are input from the battery ECU 52 by communication.

Figure 5:
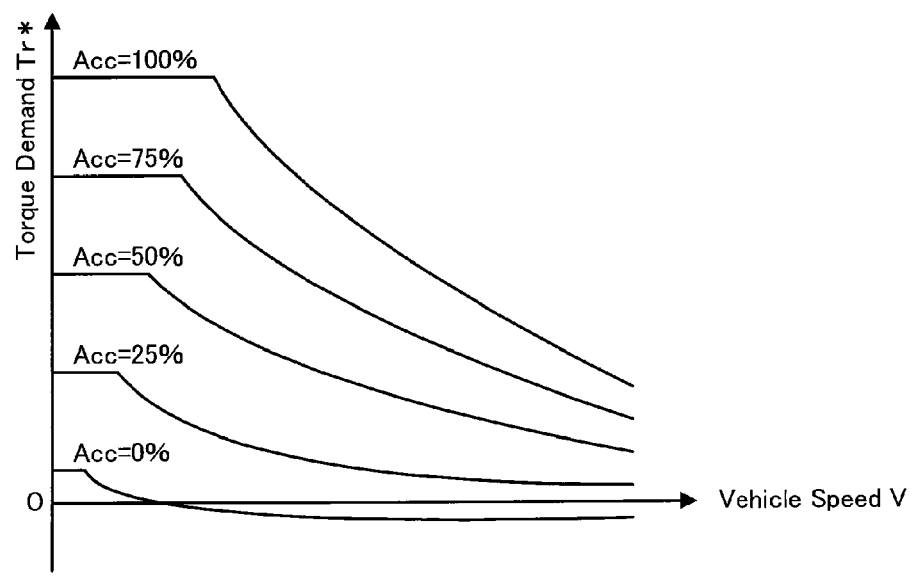
FIG. 5 shows one example of a torque demand setting map.
Figure 6:
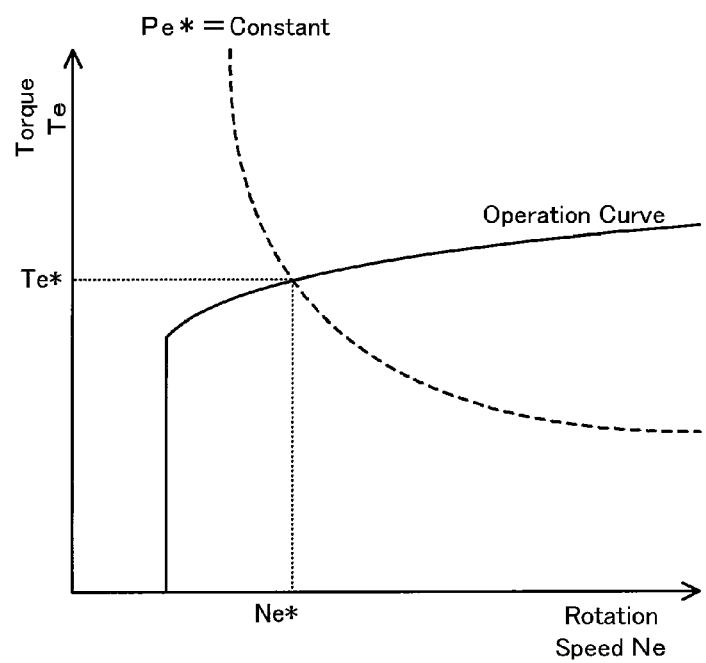
FIG. 6 shows an operation curve of an engine used to set a target rotation speed Ne* and a target torque Te* of the engine.

After the data input, the CPU 72 sets a torque demand Tr* to be output to the ring gear shaft 32a or the driveshaft linked with the drive wheels 63a and 63b as a torque required for the hybrid vehicle 20 and a power demand Pe* to be output from the engine 22, based on the input accelerator opening Acc and the input vehicle speed V (step S110). The CPU 72 subsequently utilizes an operation curve formed by connecting efficient drive points of the engine 22 to set a combination of a target rotation speed Ne* and a target torque Te* as a specific drive point for ensuring output of the power demand Pe* from the engine 22 (step S120). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 5. The power demand Pe* is calculated as the sum of the product of the set torque demand Tr* and a rotation speed Nr of the ring gear shaft 32a, a charge-discharge power demand Pb* to be charged into or discharged from the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35. The target rotation speed Ne* and the target torque Te* are given as an intersection of the operation curve and a curve of constant power demand Pe* (=Ne*×Te*) FIG. 6 shows one example of the operation curve adopted to set the target rotation speed Ne* and the target torque Te*.

The CPU 72 subsequently calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* as a torque to be output from the motor MG1 from the calculated target rotation speed Nm1* and the current rotation speed Nm1 of the motor MG1 according to Equation (2) given below (step S130):

$$Nm1^* = Ne^* \cdot (1+\rho)/\rho - Nm2/(Gr \cdot \rho) \quad (1)$$

$$Tm1^* = \rho \cdot Te^*/(1+\rho) + k1(Nm1^* - Nm1) + k2 \int (Nm1^* - Nm1) dt \quad (2)$$

Figure 7:
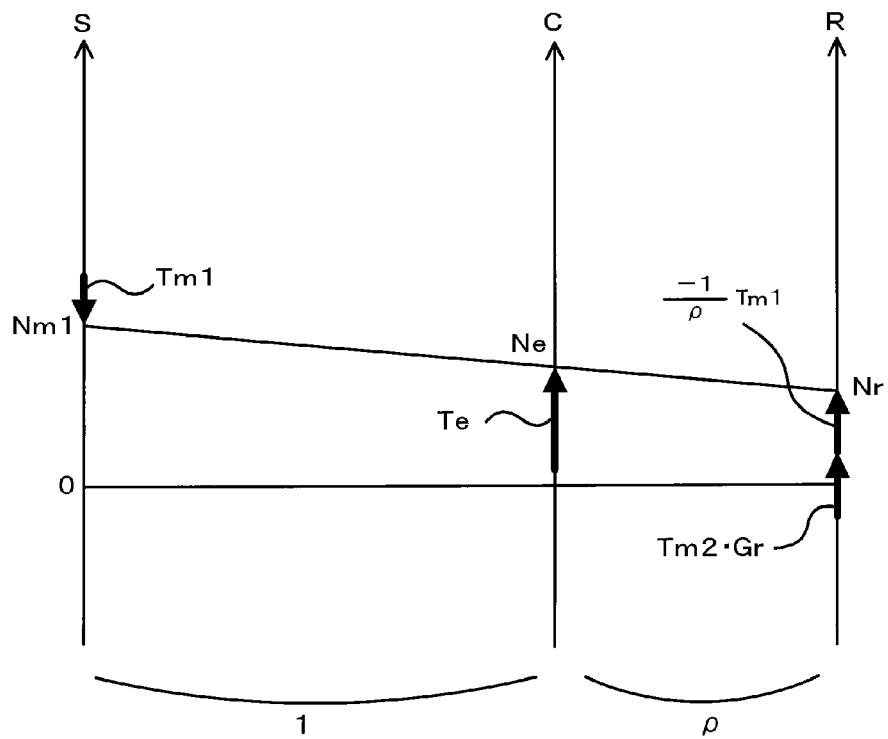
FIG. 7 is an alignment chart showing torque-rotation speed dynamics of respective rotational elements included in a power distribution integration mechanism 30 mounted on the hybrid vehicle of the embodiment.

Equation (1) is a dynamic relational expression of respective rotational elements included in the power distribution integration mechanism 30. FIG. 7 is an alignment chart showing torque-rotation speed dynamics of the respective rotational elements included in the power distribution integration mechanism 30. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (1) is readily introduced from this alignment chart. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as allowable minimum and maximum torques output from the motor MG2 according to Equations (3) and (4) given below (step S140):

$$Tmin = (Win - Tm1^* \cdot Nm1)/Nm2 \quad (3)$$

$$Tmax = (Wout - Tm1^* \cdot Nm1)/Nm2 \quad (4)$$

The lower torque restriction Tmin and the upper torque restriction Tmax are obtained by dividing respective differences between the input limit Win or the output limit Wout of the battery 50 and power consumption (power generation) of the motor MG1, which is the product of the calculated torque command Tm1* and the current rotation speed Nm1 of the motor MG1, by the current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S150):

$$Tm2tmp = (Tr^* + Tm1^*/\rho)/Gr \quad (5)$$

The CPU 72 then limits the calculated tentative motor torque Tm2tmp by the lower and the upper torque restrictions Tmin and Tmax to set a torque command Tm2* of the motor MG2 (step S160). Setting the torque command Tm2* of the motor MG2 in this manner restricts the torque demand Tr* to be output to the ring gear shaft 32a or the driveshaft in the range of the input limit Win and the output limit Wout of the battery 50. Equation (5) is readily introduced from the alignment chart of FIG. 7.

After setting the target rotation speed Ne* and the target torque Te* of the engine 22 and the torque commands Tm1* and Tm2* of the motors MG1 and MG2, the CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S170) and terminates the drive control routine. In response to reception of the settings of the target rotation speed Ne* and the target torque Te*, the engine ECU 24 performs required controls including fuel injection control and ignition control of the engine 22 to drive the engine 22 at the specific drive point defined by the combination of the target rotation speed Ne* and the target torque Te*. In response to reception of the settings of the torque commands Tm1* and Tm2*, the motor ECU 40 performs switching control of the transistors T11 through T16 in the inverter 41 and the transistors T21 through T26 in the inverter 42 to drive the motor MG1 with the torque command Tm1* and the motor MG2 with the torque command Tm2*.

The description below regards the voltage control. In the voltage control routine of FIG. 4, the CPU 72 of the hybrid electronic control unit 70 first inputs various data required for control, for example, the vehicle speed V from the vehicle speed sensor 88 and the motor temperature Tm (step S300). The motor temperature Tm is detected by the temperature sensor 46 and is input from the motor ECU 40 by communication.

After the data input, the CPU 72 successively compares the input motor temperature Tm with a preset reference temperature Tref (step S310) and compares the input vehicle speed V with a preset reference speed Vref (step S320). The reference temperature Tref is set as a relatively high temperature that is lower than allowable maximum temperatures of the motors MG1 and MG2 and depends upon the performances of the motors MG1 and MG2. The reference speed Vref represents a specific vehicle speed of ensuring favorable control of the motors MG1 and MG2 even in the state of controlling the high voltage system at a voltage level of not higher than a certain low voltage V1, which is lower than the maximum input voltage Vset of the inverters 41 and 42, and is set to, for example, 90 km/h or 100 km/h.

Figure 8:
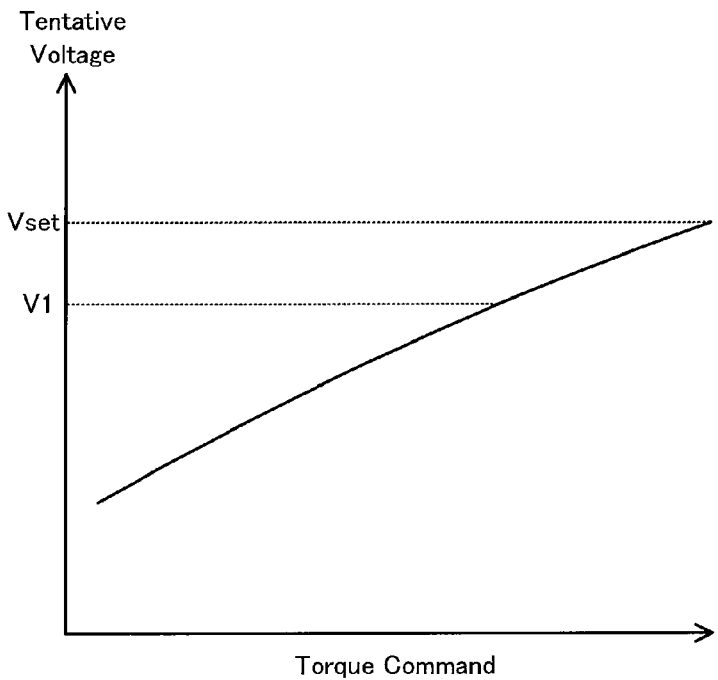
FIG. 8 shows one example of a tentative voltage setting map.

On condition that the motor temperature Tm is lower than the preset reference temperature Tref (step S310: yes) and that the vehicle speed V is lower than the preset reference speed Vref (step S320: no), it is determined that the motors MG1 and MG2 are favorably controllable even in the state of adjusting the voltage level of the high voltage system to be not higher than the certain low voltage V1. The CPU 72 then sets the certain low voltage V1 to a maximum voltage Vmax in the high voltage system (step S330). On condition that the motor temperature Tm is lower than the preset reference temperature Tref (step S310: yes) and that the vehicle speed V is not lower than the preset reference speed Vref (step S320: yes) or on condition that the motor temperature Tm is not lower than the preset reference temperature Tref (step S310: no), on the other hand, it is determined that the motors MG1 and MG2 are not favorably controllable in the state of adjusting the voltage level of the high voltage system to be not higher than the certain low voltage V1 or that the motors MG1 and MG2 have relatively high temperatures and require prevention of a further temperature rise. The CPU 72 then sets the maximum input voltage Vset of the inverters 41 and 42 to the maximum voltage Vmax in the high voltage system (step S340). The smaller between a tentative voltage based on the torque commands Tm1* and Tm2* of the motors MG1 and MG2 and the set maximum voltage Vmax is set to a voltage command Vh* (step S350). The voltage control routine is then terminated. A concrete procedure of setting the tentative voltage in this embodiment provides and stores in advance a variation in tentative voltage against the torque command having a greater absolute value between the torque commands Tm1* and Tm2* as a tentative voltage setting map in the ROM 74 and reads the tentative voltage corresponding to the torque command having the greater absolute value between the given torque commands Tm1* and Tm2* from this tentative voltage setting map. The tentative voltage setting map represents a relation of ensuring a high energy efficiency when the motors MG1 and MG2 are driven with the respective torque commands Tm1* and Tm2*. One example of the tentative voltage setting map is shown in FIG. 8. The voltage command Vh* is set to the tentative voltage within the range of not higher than the certain low voltage V1 upon determination that the motors MG1 and MG2 are favorably controllable even in the state of adjusting the voltage level of the high voltage system to be not higher than the certain low voltage V1. The voltage command Vh* is set to the tentative voltage within the range of not higher than the maximum input voltage Vset upon determination that the motors MG1 and MG2 are not favorably controllable in the state of adjusting the voltage level of the high voltage system to be not higher than the certain low voltage V1 or that the motors MG1 and MG2 have relatively high temperatures and require prevention of a further temperature rise. After setting the voltage command Vh*, the hybrid electronic control unit 70 performs switching control of the transistors T31 and T32 in the booster circuit 55 to adjust the voltage level of the high voltage system to the voltage command Vh*. In the hybrid vehicle 20 of the embodiment, the adjustment of the voltage level of the high voltage system to be not higher than the certain low voltage V1 desirably decreases a potential loss due to the switching operations of the transistors T31 and T32 in the booster circuit 55 and a potential loss due to the switching operations of the transistors T11 through T16 in the inverter 41 and the transistors T21 through T26 in the inverter 42. Compared with the adjustment of the voltage level of the high voltage system to be not higher than the maximum input voltage Vset, this arrangement effectively improves the overall energy efficiency of the hybrid vehicle 20. For the improved overall energy efficiency of the hybrid vehicle 20, it is thus desirable to adjust the voltage level of the high voltage system to be not higher than the certain low voltage V1 on condition that the motor temperature Tm is lower than the preset reference temperature Tref and that the vehicle speed V is lower than the preset reference speed Vref. The voltage level of the high voltage system is adjusted to be not higher than the maximum input voltage Vset on condition that the motor temperature Tm is lower than the preset reference temperature Tref and that the vehicle speed V is not lower than the preset reference speed Vref. This arrangement desirably protects the battery 50 from a potential over-discharge. On condition that the motor temperature Tm is not lower than the preset reference temperature Tref, the voltage level of the high voltage system is adjusted to be not higher than the maximum input voltage Vset, irrespective of the vehicle speed V. This arrangement decreases the electric current flowing through the motors MG1 and MG2 and effectively prevents a further temperature rise of the motors MG1 and MG2.

As described above, at the vehicle speed V of lower than the preset reference speed Vref, the hybrid vehicle 20 of the embodiment adjusts the voltage level of the high voltage system to be not higher than the certain low voltage V1, while controlling the engine 22 and the motors MG1 and MG2 to operate the engine 22 at the specific drive point defined by the target rotation speed Ne* and the target torque Te* within the range of the input limit Win and the output limit Wout of the battery 50 and to ensure output of the torque demand Tr* to the ring gear shaft 32a or the driveshaft. This arrangement effectively improves the overall energy efficiency of the hybrid vehicle 20. When the vehicle speed V is not lower than the preset reference speed Vref, the voltage level of the high voltage system is adjusted to be not higher than the maximum input voltage Vset. This arrangement desirably protects the battery 50 from a potential over-discharge, which may occur in the state of adjusting the voltage level of the high voltage system to be not higher than the certain low voltage V1 on condition that the vehicle speed V is not lower than the preset reference speed Vref. At the motor temperature Tm of not lower than the preset reference temperature Tref, the voltage level of the high voltage system is adjusted to be not higher than the maximum input voltage Vset, irrespective of the vehicle speed V. This arrangement decreases the electric current flowing through the motors MG1 and MG2 and effectively prevents a further temperature rise of the motors MG1 and MG2. The voltage command Vh* is set to the specific voltage corresponding to the torque commands Tm1* and Tm2* of the motors MG1 and MG2 within the range of not higher than the maximum voltage Vmax. The specific voltage is set to either the certain low voltage V1 or the maximum input voltage Vset, based on the result of the comparison between the vehicle speed V and the preset reference speed Vref. This arrangement enables the motors MG1 and MG2 to be driven and controlled with the voltage corresponding to the torque commands Tm1* and Tm2* of the motors MG1 and MG2, thus improving the overall energy efficiency of the hybrid vehicle 20.

At the motor temperature Tm of lower than the preset reference temperature Tref, the hybrid vehicle 20 of the embodiment adjusts the voltage level of the high voltage system to be not higher than the certain low voltage V1 on condition that the vehicle speed V is lower than the preset reference speed Vref, while adjusting the voltage level of the high voltage system to be not higher than the maximum input voltage Vset on condition that the vehicle speed V is not lower than the preset reference speed Vref. This procedure is, however, not restrictive but may be modified adequately. For example, at the motor temperature Tm of lower than the preset reference temperature Tref, one modified procedure may adjust the voltage level of the high voltage system to be not higher than the certain low voltage V1 on condition that the vehicle speed V is lower than the preset reference speed Vref, adjust the voltage level of the high voltage system to be not higher than a specific second low voltage V2, which is greater than the certain low voltage V1 but is smaller than the maximum input voltage Vset, on condition that the vehicle speed V is not lower than the preset reference speed Vref but is lower than a preset second reference speed Vref2 higher than the reference speed Vref, and adjust the voltage level of the high voltage system to be not higher than the maximum input voltage Vset on condition that the vehicle speed V is not lower than the preset second reference speed Vref2. Another modification may compare the vehicle speed V with three or a greater number of different stepwise reference speeds and adjust the voltage level of the high voltage system to be not higher than a corresponding reference voltage set for each vehicle speed zone.

The hybrid vehicle 20 of the embodiment set the voltage command Vh* to the specific voltage corresponding to the torque commands Tm1* and Tm2* of the motors MG1 and MG2 within in the range of not higher than the maximum voltage Vmax set based on the motor temperature Tm and the vehicle speed V. One modified procedure may set the voltage command Vh* to the maximum voltage Vmax set based on the motor temperature Tm and the vehicle speed V, irrespective of the torque commands Tm1* and Tm2* of the motors MG1 and MG2.

In the hybrid vehicle 20 of the embodiment, at the motor temperature Tm of not lower than the preset reference temperature Tref, the voltage level of the high voltage system is adjusted to be not higher than the maximum input voltage Vset, irrespective of the vehicle speed V. One modified procedure may adjust the voltage level of the high voltage system to be not higher than the certain low voltage V1 on condition that the vehicle V is lower than the preset reference speed Vref and adjust the voltage level of the high voltage system to be not higher than the maximum input voltage Vset on condition that the vehicle V is not lower than the preset reference speed Vref.

Figure 9:
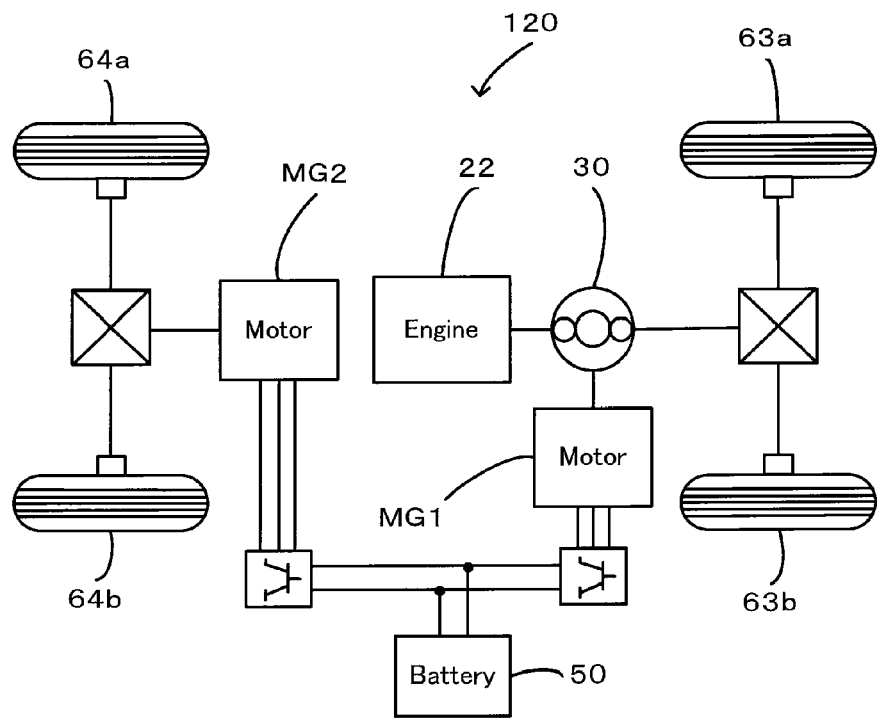
FIG. 9 schematically illustrates the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 9. In the hybrid vehicle 120 of FIG. 9, the power of the motor MG2 is connected to another axle (an axle linked with wheels 64a and 64b) that is different from the axle connecting with the ring gear shaft 32a (the axle linked with the drive wheels 63a and 63b).

Figure 10:
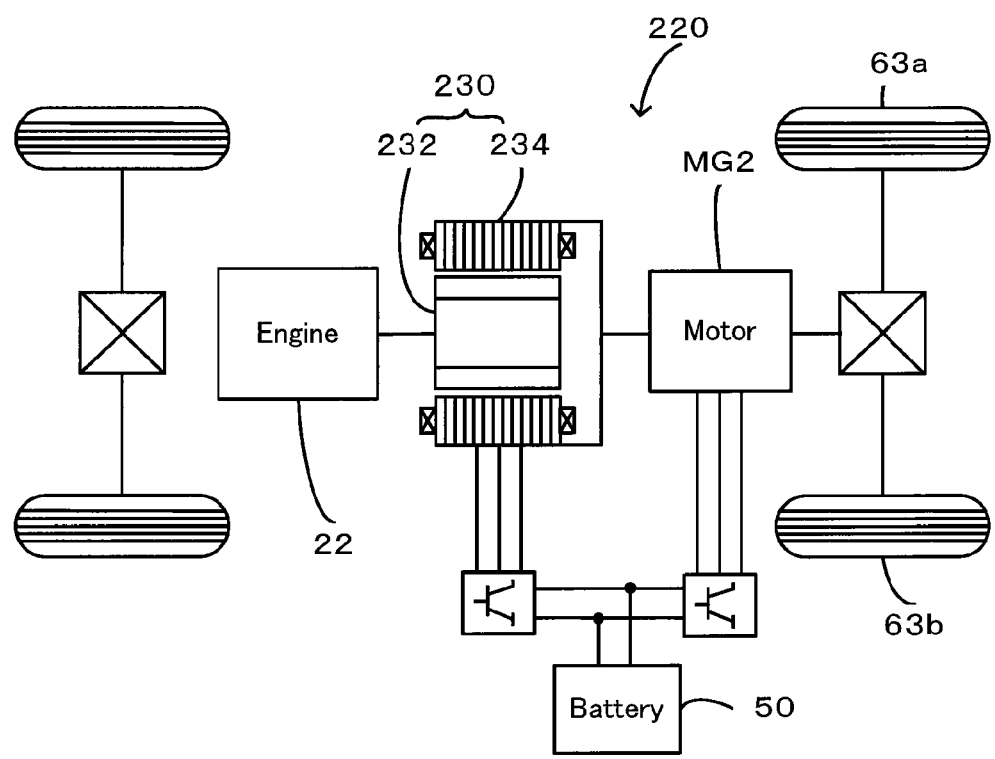
FIG. 10 schematically illustrates the configuration of still another hybrid vehicle 220 in another modified example.

In the hybrid vehicle 20 of the embodiment, the power of the engine 22 is output via the power distribution integration mechanism 30 to the ring gear shaft 32a or the driveshaft linked with the drive wheels 63a and 63b. The technique of the invention is also applicable to a hybrid vehicle 220 of another modified structure shown in FIG. 10. The hybrid vehicle 220 of FIG. 10 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63a and 63b. The pair-rotor motor 230 transmits part of the output power of the engine 22 to the driveshaft, while converting the residual engine output power into electric power.

The above embodiment describes the hybrid vehicle as one application of the invention. The technique of the invention is, however, not restricted to the hybrid vehicle but may be actualized by diversity of other applications, for example, vehicles other than motor vehicles as well as a control method of the hybrid vehicle.

The primary elements in the embodiment and its modified examples are mapped to the primary constituents in the claims of the invention as described below. The engine 22 in the embodiment corresponds to the 'internal combustion engine' in the claims of the invention. The combination of the power distribution integration mechanism 30 and the motor MG1 in the embodiment is equivalent to the 'electric power-mechanical power input output assembly' in the claims of the invention. The motor MG2, the battery 50, the booster circuit 55, and the vehicle speed sensor 88 in the embodiment are respectively equivalent to the 'motor', the 'accumulator', the 'voltage adjustment-power transmission structure', and the 'vehicle speed detector' in the claims of the invention. The hybrid electronic control unit 70 executing the processing of step S110 in the drive control routine of FIG. 3 to set the torque demand Tr* based on the accelerator opening Acc and the vehicle speed V in the embodiment corresponds to the 'driving force demand setting module' in the claims of the invention. The combination of the hybrid electronic control unit 70 executing the processing of steps S300 to S350 in the voltage control routine of FIG. 4 and the processing of steps S120 to S170 in the drive control routine of FIG. 3, the engine ECU 24 controlling the engine 22 based on the received target rotation speed Ne* and target torque Te*, and the motor ECU 40 controlling the motors MG1 and MG2 based on the received torque commands Tm1* and Tm2* in the embodiment corresponds to the 'controller' in the claims of the invention. On condition that the motor temperature Tm is lower than the preset reference temperature Tref and that the vehicle speed V is lower than the preset reference speed Vref, the hybrid electronic control unit 70 controls the booster circuit 55 to adjust the voltage level of the high voltage system to be not higher than the certain low voltage V1, while setting the target rotation speed Ne* and the target torque Te* of the engine 22 and the torque commands Tm1* and Tm2* of the motors MG1 and MG2 to drive the hybrid vehicle 20 with output of the torque demand Tr* to the ring gear shaft 32a or the driveshaft within the range of the input limit Win and the output limit Wout of the battery 50 and sending the settings of the target rotation speed Ne*, the target torque Te*, and the torque commands Tm1* and Tm2* to the engine ECU 24 and the motor ECU 40. On condition that the motor temperature Tm is lower than the preset reference temperature Tref and that the vehicle speed V is not lower than the preset reference speed Vref, the hybrid electronic control unit 70 controls the booster circuit 55 to adjust the voltage level of the high voltage system to be not higher than the maximum input voltage Vset, while setting the target rotation speed Ne* and the target torque Te* of the engine 22 and the torque commands Tm1* and Tm2* of the motors MG1 and MG2 to drive the hybrid vehicle 20 with output of the torque demand Tr* to the ring gear shaft 32a or the driveshaft within the range of the input limit Win and the output limit Wout of the battery 50 and sending the settings of the target rotation speed Ne*, the target torque Te*, and the torque commands Tm1* and Tm2* to the engine ECU 24 and the motor ECU 40. On condition that the motor temperature Tm is not lower than the preset reference temperature Tref, the hybrid electronic control unit 70 controls the booster circuit 55, irrespective of the vehicle speed V, to adjust the voltage level of the high voltage system to be not higher than the maximum input voltage Vset, while setting the target rotation speed Ne* and the target torque Te* of the engine 22 and the torque commands Tm1* and Tm2* of the motors MG1 and MG2 to drive the hybrid vehicle 20 with output of the torque demand Tr* to the ring gear shaft 32a or the driveshaft within the range of the input limit Win and the output limit Wout of the battery 50 and sending the settings of the target rotation speed Ne*, the target torque Te*, and the torque commands Tm1* and Tm2* to the engine ECU 24 and the motor ECU 40. The temperature sensor 46, the motor MG1, and the power distribution integration mechanism 30 in the embodiment are respectively equivalent to the 'temperature detector', the 'generator', and the 'three shaft-type power input output structure' in the claims of the invention. The pair-rotor motor 230 in the modified example is also equivalent to the 'electric power-mechanical power input output assembly' in the claims of the invention.

The 'internal combustion engine' is not restricted to the internal combustion engine designed to consume a hydrocarbon fuel, such as gasoline or light oil, and thereby output power, but may be an internal combustion engine of any other design, for example, a hydrogen engine. The 'electric power-mechanical power input output assembly' is not restricted to the combination of the power distribution integration mechanism 30 with the motor MG1 or to the pair-rotor motor 230 but may be any structure connected with a driveshaft and with an output shaft of the internal combustion engine in such a manner as to be rotatable independently of the driveshaft and configured to input and output power to and from the driveshaft and the output shaft through input and output of electric power and mechanical power. The 'motor' is not restricted to the motor MG2 constructed as a synchronous motor generator but may be any type of motor designed to input and output power from and to the driveshaft, for example, an induction motor. The 'accumulator' is not restricted to the battery 50 as a secondary battery but may be a capacitor or any other storage unit arranged to transmit electric power to and from the generator. The 'voltage adjustment-power transmission structure' is not restricted to the booster circuit 55 but may be any structure connected with the generator and with the motor, linked with the accumulator, and configured to adjust the voltage on the generator-motor side and the voltage on the accumulator side and thereby allow transmission of electric power between the generator-motor side and the accumulator side. The 'vehicle speed detector' is not restricted to the vehicle speed sensor 88 but may be any structure designed to detect the vehicle speed. The 'driving force demand setting module' is not restricted to the processing of setting the torque demand based on both the accelerator opening Acc and the vehicle speed V but may be any configuration of setting a driving force demand required for driving the hybrid vehicle, for example, a configuration of setting a torque demand based on only the accelerator opening Acc or a configuration of setting a torque demand based on the driving location on a preset driving route. The 'controller' is not restricted to the combination of the hybrid electronic control unit 70, the engine ECU 24, and the motor ECU 40 but may be actualized by a single electronic control unit. The processing executed by the 'controller' is not restricted to, on condition that the motor temperature Tm is lower than the preset reference temperature Tref and that the vehicle speed V is lower than the preset reference speed Vref, controlling the booster circuit 55 to adjust the voltage level of the high voltage system to be not higher than the certain low voltage V1, while controlling the engine 22 and the motors MG1 and MG2 to drive the hybrid vehicle 20 with output of the torque demand Tr* to the ring gear shaft 32a or the driveshaft within the range of the input limit Win and the output limit Wout of the battery 50. Similarly the processing executed by the 'controller' is not restricted to, on condition that the motor temperature Tm is lower than the preset reference temperature Tref and that the vehicle speed V is not lower than the preset reference speed Vref, controlling the booster circuit 55 to adjust the voltage level of the high voltage system to be not higher than the maximum input voltage Vset, while controlling the engine 22 and the motors MG1 and MG2 to drive the hybrid vehicle 20 with output of the torque demand Tr* to the ring gear shaft 32a or the driveshaft within the range of the input limit Win and the output limit Wout of the battery 50. Similarly the processing executed by the 'controller' is not restricted to, on condition that the motor temperature Tm is not lower than the preset reference temperature Tref, controlling the booster circuit 55, irrespective of the vehicle speed V, to adjust the voltage level of the high voltage system to be not higher than the maximum input voltage Vset, while controlling the engine 22 and the motors MG1 and MG2 to drive the hybrid vehicle 20 with output of the torque demand Tr* to the ring gear shaft 32a or the driveshaft within the range of the input limit Win and the output limit Wout of the battery 50. On condition that the vehicle speed is lower than a preset reference vehicle speed, the 'controller' may control the voltage adjustment-power transmission structure to adjust the voltage on the drive system side to be not higher than a first voltage, which is less than an allowable maximum voltage set based on rated values of the electric power-mechanical power input output assembly and the motor, while controlling the internal combustion engine, the electric power-mechanical power input output assembly, and the motor to drive the hybrid vehicle with a driving force equivalent to the set driving force demand. On condition that the vehicle speed is not lower than the preset reference vehicle speed, the 'controller' may control the voltage adjustment-power transmission structure to adjust the voltage on the drive system side to be not higher than the allowable maximum voltage, while controlling the internal combustion engine, the electric power-mechanical power input output assembly, and the motor to drive the hybrid vehicle with a driving force equivalent to the set driving force demand. For example, the 'controller' may adjust the voltage level of the high voltage system to be not higher than the certain low voltage V1 even at the motor temperature Tm of not lower than the preset reference temperature Tref on condition that the vehicle speed V is lower than the preset reference speed Vref, while adjusting the voltage level of the high voltage system to be not higher than the maximum input voltage Vset on condition that the vehicle speed V is not lower than the preset reference speed Vref. The 'generator' is not restricted to the motor MG1 constructed as a synchronous motor generator but may be any type of generator designed to input and output power, for example, an induction motor. The 'three shaft-type power input output structure' is not restricted to the power distribution integration mechanism 30 but may be any structure connected to three shafts, the driveshaft, the output shaft of the internal combustion engine, and a rotating shaft of the generator, and designed to input and output power to a residual shaft based on powers input from and output to any two shafts among the three shafts, for example, a structure adopting a double pinion-type planetary gear mechanism, a structure connected to four or a greater number of shafts by combination of multiple planetary gear mechanisms, or a structure adopting a differential gear or another differential motion mechanism other than the planetary gear mechanism.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

The disclosure of Japanese Patent Application No. 2008-044926 filed Feb. 26, 2008 including specification, drawings and claims is incorporated herein by reference in its entirety.

What is claimed is:

1. A hybrid vehicle, comprising:
    an internal combustion engine;
    an electric power-mechanical power input output assembly connected with a driveshaft linked to an axle of the hybrid vehicle and with an output shaft of the internal combustion engine in such a manner as to be rotatable independently of the driveshaft and configured to input and output power to and from the driveshaft and the output shaft through input and output of electric power and mechanical power;
    a motor constructed to input and output a power for driving the hybrid vehicle;
    an accumulator designed to be chargeable and dischargeable;
    a voltage adjustment-power transmission structure connected with the electric power-mechanical power input output assembly and with the motor, linked with the accumulator, and configured to adjust a voltage on a drive system side toward the electric power-mechanical power input output assembly and the motor and a voltage on an accumulator side toward the accumulator and thereby allow transmission of electric power between the drive system side and the accumulator side;
    a vehicle speed detector constructed to detect a vehicle speed of the hybrid vehicle;
    a driving force demand setting module configured to set a driving force demand required for driving the hybrid vehicle; and
    a controller configured to, when the detected vehicle speed is lower than a preset reference vehicle speed, control the voltage adjustment-power transmission structure to adjust the voltage on the drive system side to be not higher than a first voltage, which is less than an allowable maximum voltage set based on rated values of the electric power-mechanical power input output assembly and the motor, while controlling the internal combustion engine, the electric power-mechanical power input output assembly, and the motor to drive the hybrid vehicle with a driving force equivalent to the set driving force demand, and
    when the detected vehicle speed is not lower than the preset reference vehicle speed, the controller controlling the voltage adjustment-power transmission structure to adjust the voltage on the drive system side to be not higher than the allowable maximum voltage, while controlling the internal combustion engine, the electric power-mechanical power input output assembly, and the motor to drive the hybrid vehicle with a driving force equivalent to the set driving force demand.

2. The hybrid vehicle in accordance with claim 1, the hybrid vehicle further having:
a temperature detector constructed to detect a temperature of either the electric power-mechanical power input output assembly or the motor,
wherein when the detected temperature is not lower than a preset reference temperature, the controller controls the voltage adjustment-power transmission structure to adjust the voltage on the drive system side to be not higher than the maximum allowable voltage, irrespective of the detected vehicle speed, while controlling the internal combustion engine, the electric power-mechanical power input output assembly, and the motor to drive the hybrid vehicle with the driving force equivalent to the set driving force demand.

3. The hybrid vehicle in accordance with claim 1, wherein the controller sets a target drive point of the internal combustion engine based on a power demand corresponding to the set driving force demand and a predetermined restriction, and sets driving commands of the electric power-mechanical power input output assembly and the motor to drive the hybrid vehicle with operation of the internal combustion engine at the set target drive point and with satisfaction of the set driving force demand,
when the detected vehicle speed is lower than the preset reference vehicle speed, the controller sets an object voltage based on the set driving commands within a range of the first voltage and controls the voltage adjustment-power transmission structure to adjust the voltage on the drive system side to the set object voltage, while controlling the internal combustion engine, the electric power-mechanical power input output assembly, and the motor to drive the hybrid vehicle with operation of the internal combustion engine at the set target drive point and with operations of the electric power-mechanical power input output assembly and the motor at the set driving commands, and
when the detected vehicle speed is not lower than the preset reference vehicle speed, the controller sets the object voltage based on the set driving commands within a range of the allowable maximum voltage and controls the voltage adjustment-power transmission structure to adjust the voltage on the drive system side to the set object voltage, while controlling the internal combustion engine, the electric power-mechanical power input output assembly, and the motor to drive the hybrid vehicle with operation of the internal combustion engine at the set target drive point and with operations of the electric power-mechanical power input output assembly and the motor at the set driving commands.

4. The hybrid vehicle in accordance with claim 1, wherein when the detected vehicle speed is lower than the preset reference vehicle speed, the controller controls the voltage adjustment-power transmission structure to adjust the voltage on the drive system side to be not higher than the first voltage, which is less than the allowable maximum voltage set based on the rated values of the electric power-mechanical power input output assembly and the motor, while controlling the internal combustion engine, the electric power-mechanical power input output assembly, and the motor to drive the hybrid vehicle with the driving force equivalent to the set driving force demand,
when the detected vehicle speed is not lower than the preset reference vehicle speed but is lower than a preset second reference vehicle speed, the controller controls the voltage adjustment-power transmission structure to adjust the voltage on the drive system side to be not higher than a second voltage, which is less than the allowable maximum voltage but is greater than the first voltage, while controlling the internal combustion engine, the electric power-mechanical power input output assembly, and the motor to drive the hybrid vehicle with the driving force equivalent to the set driving force demand, and
when the detected vehicle speed is not lower than the preset second reference vehicle speed, the controller controls the voltage adjustment-power transmission structure to adjust the voltage on the drive system side to be not higher than the allowable maximum voltage, while controlling the internal combustion engine, the electric power-mechanical power input output assembly, and the motor to drive the hybrid vehicle with the driving force equivalent to the set driving force demand.

5. The hybrid vehicle in accordance with claim 4, wherein the controller sets a target drive point of the internal combustion engine based on a power demand corresponding to the set driving force demand and a predetermined restriction, and sets driving commands of the electric power-mechanical power input output assembly and the motor to drive the hybrid vehicle with operation of the internal combustion engine at the set target drive point and with satisfaction of the set driving force demand,
when the detected vehicle speed is lower than the preset reference vehicle speed, the controller sets an object voltage based on the set driving commands within a range of the first voltage and controls the voltage adjustment-power transmission structure to adjust the voltage on the drive system side to the set object voltage, while controlling the internal combustion engine, the electric power-mechanical power input output assembly, and the motor to drive the hybrid vehicle with operation of the internal combustion engine at the set target drive point and with operations of the electric power-mechanical power input output assembly and the motor at the set driving commands,
when the detected vehicle speed is not lower than the preset reference vehicle speed but is lower than a preset second reference vehicle speed, the controller sets the object voltage based on the set driving commands within a range of the second voltage and controls the voltage adjustment-power transmission structure to adjust the voltage on the drive system side to the set object voltage, while controlling the internal combustion engine, the electric power-mechanical power input output assembly, and the motor to drive the hybrid vehicle with operation of the internal combustion engine at the set target drive point and with operations of the electric power-mechanical power input output assembly and the motor at the set driving commands, and
when the detected vehicle speed is not lower than the preset second reference vehicle speed, the controller sets the object voltage based on the set driving commands within a range of the allowable maximum voltage and controls the voltage adjustment-power transmission structure to adjust the voltage on the drive system side to the set object voltage, while controlling the internal combustion engine, the electric power-mechanical power input output assembly, and the motor to drive the hybrid vehicle with operation of the internal combustion engine at the set target drive point and with operations of the electric power-mechanical power input output assembly and the motor at the set driving commands.

6. The hybrid vehicle in accordance with claim 1, wherein the electric power-mechanical power input output assembly has:

a generator constructed to input and output power; and a three shaft-type power input output structure connected to three shafts, the driveshaft, the output shaft of the internal combustion engine, and a rotating shaft of the generator, and designed to input and output power to a residual shaft based on powers input from and output to any two shafts among the three shafts.

7. A control method of a hybrid vehicle, the hybrid vehicle having:

an internal combustion engine; an electric power-mechanical power input output assembly connected with a driveshaft linked to an axle of the hybrid vehicle and with an output shaft of the internal combustion engine in such a manner as to be rotatable independently of the driveshaft and configured to input and output power to and from the driveshaft and the output shaft through input and output of electric power and mechanical power; a motor constructed to input and output a power for driving the hybrid vehicle; an accumulator designed to be chargeable and dischargeable; and a voltage adjustment-power transmission structure connected with the electric power-mechanical power input output assembly and with the motor, linked with the accumulator, and configured to adjust a voltage on a drive system side toward the electric power-mechanical power input output assembly and the motor and a voltage on an accumulator side toward the accumulator and thereby allow transmission of electric power between the drive system side and the accumulator side, when a vehicle speed is lower than a preset reference vehicle speed, the control method controlling the voltage adjustment-power transmission structure to adjust the voltage on the drive system side to be not higher than a first voltage, which is less than an allowable maximum voltage set based on rated values of the electric power-mechanical power input output assembly and the motor, while controlling the internal combustion engine, the electric power-mechanical power input output assembly, and the motor to drive the hybrid vehicle with a driving force equivalent to a required driving force demand, and when the vehicle speed is not lower than the preset reference vehicle speed, the control method controlling the voltage adjustment-power transmission structure to adjust the voltage on the drive system side to be not higher than the allowable maximum voltage, while controlling the internal combustion engine, the electric power-mechanical power input output assembly, and the motor to drive the hybrid vehicle with a driving force equivalent to the required driving force demand.

8. The control method of the hybrid vehicle in accordance with claim 7, when a temperature of the motor is not lower than a preset reference temperature, the control method controlling the voltage adjustment-power transmission structure to adjust the voltage on the drive system side to be not higher than the maximum allowable voltage, irrespective of the vehicle speed, while controlling the internal combustion engine, the electric power-mechanical power input output assembly, and the motor to drive the hybrid vehicle with the driving force equivalent to the required driving force demand.

* * * * *